L. BAUROTH.
GASKET.
APPLICATION FILED OCT. 11, 1913.

1,191,651.

Patented July 18, 1916.

WITNESSES:
R. S. Allen.
F. E. Aul.

INVENTOR.
Leonhard Bauroth,
By Owen & Owen,
His attys.

UNITED STATES PATENT OFFICE.

LEONHARD BAUROTH, OF TOLEDO, OHIO, ASSIGNOR TO CHARLES H. WACHER, OF CHICAGO, ILLINOIS.

GASKET.

1,191,651.  Specification of Letters Patent.  Patented July 18, 1916.

Application filed October 11, 1913. Serial No. 794,590.

*To all whom it may concern:*

Be it known that I, LEONHARD BAUROTH, a citizen of the United States, and a resident of Toledo, in the county of Lucas and State of Ohio, have invented a certain new and useful Gasket; and I do hereby declare the following to be a full, clear, and exact description of the invention, such as will enable others skilled in the art to which it appertains to make and use the same, reference being had to the accompanying drawings, and to the characters of reference marked thereon, which forms a part of this specification.

This invention relates particularly to gaskets, but is not restricted to such use as it may be used in any connection for which it may be adapted or appropriate.

Considerable difficulty has been experienced in the use of casks, barrels or the like due to the gaskets commonly employed in connection with the bungs thereof becoming loose, misshaped and cut, and in consequence dropping from the bung or permitting leakage around the same.

The object of my invention is the provision of a simple and inexpensive gasket of this character, which is designed to obviate the difficulties above noted and to materially prolong the life and stability of such gaskets.

The invention is fully described in the following specification, and while, in its broader aspect, it is capable of embodiment in numerous forms, a preferred embodiment thereof is illustrated in the accompanying drawings, in which,—

Figure 1:
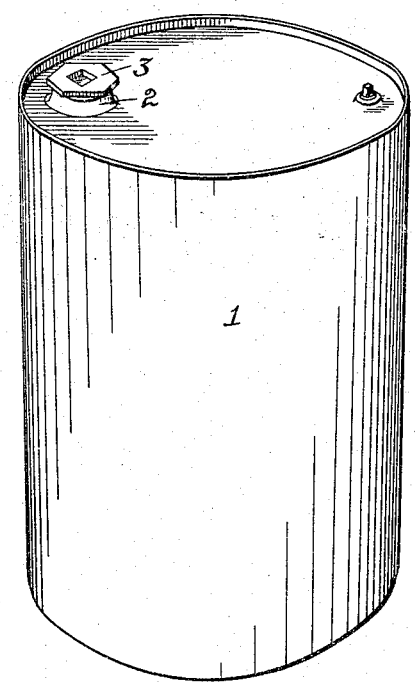
Figure 2:
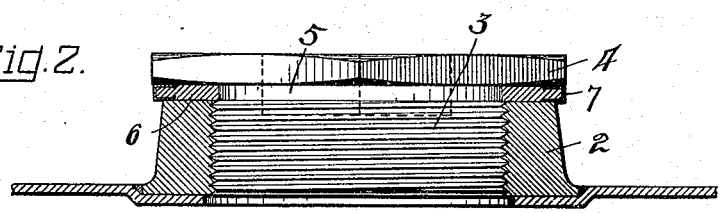
Figure 3:
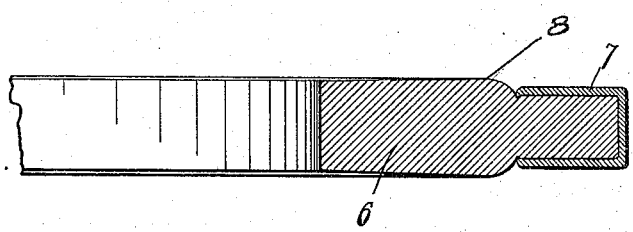

Figure 1 is a perspective view of a cask equipped with my improved gasket. Fig. 2 is an enlarged central section of the bung receiving part thereof and gasket with the bung in full in screwed-home position therein, and Fig. 3 is an enlarged section of a portion of the gasket as it substantially appears before use.

Referring to the drawings, 1 designates a cask, barrel or other form of container having a bung-receiving flange 2 on a part thereof, which, in the present instance, is internally threaded to receive a threaded bung or plug member 3. It is customary to provide the bung or plug member 3 at its outer end with a transversely extending peripheral flange 4 for overlapping and extending transversely beyond the outer end of the flange 2, and to provide an annular groove 5 at the base of the threaded portion of the bung with the inner side of the flange 4 forming one wall thereof.

The gasket forming my invention comprises the body part 6, which is usually, but not necessarily, of annular or ring form, and may be of any suitable non-metallic gasket forming material, and the edge binding 7 of sheet metal or other suitable material. The binding 7 is preferably made U-shape in cross-section, as shown, to receive the outer edge portion of the part 6, and has its loop portion abutting against the outer peripheral edge of the body part to resist an outward or radial expansion of such part, and its leg portions embracing opposite sides of the body part to retain the binding in clamped engagement therewith.

The closely clamping of the binding 7 onto the outer edge portion of the yielding gasket material 6 causes a swelling of such material adjacent to the binding, substantially as shown at 8. The swelling of the gasket at 8 renders it thicker at such point than the binding 7, so that a considerable compressing force may be exerted on the body part 6 of the gasket before pressure is brought to bear on the binding. When the gasket is first applied to the bung or plug member its opening is preferably of suitable size to be forced over the threaded part of the plug to place it in register with the groove 5 thereof. Upon a screwing-home of the plug within the flange 2 the gasket material within the point of gripping of the flanges 2 and 4 is compressed and flattened. As the body part of the gasket expands outwardly due to the resistance of the marginal binding strip 7 to such expansion the body part is caused to contract within and to fill the groove 5, thus effecting a tight fitting of the gasket around the plug portion of the bung. It is also evident that the binding serves to prevent an enlarging of the gasket under varying conditions of use, and consequently materially prolongs the life thereof.

I wish it understood that my invention is not limited to any specific construction but contemplates broadly the provision of a gasket having an edge thereof provided with an unyielding binding to permit the gasket proper to radially expand or contract in one direction only relative to its center when subjected to a flattening pressure.

Having thus described my invention, what I claim as new, and desire to secure by Letters Patent, is,—

A gasket having a non-metallic body part and an endless U-shaped non-expansible metallic binding for the outer edge portion of said part, the exposed portion of the body part being of greater thickness than the binding when mounted on the edge thereof, whereby a considerable compressing force may be exerted on the exposed portion of the body part before pressure is brought to bear on the binding.

In testimony whereof, I have hereunto signed my name to this specification in the presence of two subscribing witnesses.

LEONHARD BAUROTH.

Witnesses:
F. E. AUL,
S. T. KLOTZ.

Copies of this patent may be obtained for five cents each, by addressing the "Commissioner of Patents, Washington, D. C."

It is hereby certified that the name of the assignee in Letters Patent No. 1,191,651, granted July 18, 1916, upon the application of Leonhard Bauroth, of Toledo, Ohio, for an improvement in "Gaskets," was erroneously written and printed as "Charles H. Wacher," whereas said name should have been written and printed as *Charles H. Wacker*, as shown by the records of assignments in this Office; and that the said Letters Patent should be read with this correction therein that the same may conform to the record of the case in the Patent Office.

Signed and sealed this 15th day of August, A. D., 1916.

[SEAL.]

F. W. H. CLAY,

*Acting Commissioner of Patents.*

Cl. 137—28.